United States Patent
Suresh et al.

(10) Patent No.: US 11,270,051 B1
(45) Date of Patent: Mar. 8, 2022

(54) MODEL-BASED DESIGN AND PARTITIONING FOR HETEROGENEOUS INTEGRATED CIRCUITS

(71) Applicant: Xilinx, Inc., San Jose, CA (US)

(72) Inventors: Avinash Somalinga Suresh, Hyderabad (IN); Ali Behboodian, Fremont, CA (US)

(73) Assignee: Xilinx, Inc., San Jose, CA (US)

(*) Notice: Subject to any disclaimer, the term of this patent is extended or adjusted under 35 U.S.C. 154(b) by 0 days.

(21) Appl. No.: 17/092,875

(22) Filed: Nov. 9, 2020

(51) Int. Cl.
*G06F 30/00* (2020.01)
*G06F 30/327* (2020.01)
*G06F 30/398* (2020.01)
*G06F 30/3953* (2020.01)
*G06F 30/392* (2020.01)

(52) U.S. Cl.
CPC ......... *G06F 30/327* (2020.01); *G06F 30/392* (2020.01); *G06F 30/398* (2020.01); *G06F 30/3953* (2020.01)

(58) Field of Classification Search
CPC .... G06F 30/327; G06F 30/392; G06F 30/398; G06F 30/3953
See application file for complete search history.

(56) References Cited

U.S. PATENT DOCUMENTS

| | | | | |
|---|---|---|---|---|
| 5,854,929 A * | 12/1998 | Van Praet | ............... | G06F 30/30 717/156 |
| 7,886,252 B2 * | 2/2011 | Okada | .................... | G06F 30/30 716/104 |
| 10,586,003 B1 | 3/2020 | Suresh | | |
| 10,628,622 B1 | 4/2020 | Sivaraman et al. | | |
| 10,747,690 B2 | 8/2020 | Bilski et al. | | |
| 10,783,295 B1 | 9/2020 | Dong et al. | | |
| 10,802,807 B1 * | 10/2020 | Hsu | .................... | G06F 11/302 |
| 10,891,132 B2 | 1/2021 | Gupta et al. | | |
| 2004/0088691 A1 | 5/2004 | Hammes et al. | | |

(Continued)

OTHER PUBLICATIONS

Roquier Ghislain et al: "Hardware and Software Synthesis of Heterogeneous Systems from Data flow Programs" Journal of Electrical and Computer Engineering, vol. 2012, Jan. 1, 2012 (Jan. 1, 2012), pp. 1-11.

(Continued)

*Primary Examiner* — Naum Levin
(74) *Attorney, Agent, or Firm* — Kevin T. Cuenot

(57) ABSTRACT

Model-based implementation of a design for a heterogeneous integrated circuit can include converting a model, created as a data structure using a modeling system, into a data flow graph, wherein the model represents a design for implementation in an integrated circuit having a plurality of systems, the systems being heterogeneous, classifying nodes of the data flow graph for implementation in different ones of the plurality of systems of the integrated circuit, and partitioning the data flow graph into a plurality of sub-graphs based on the classifying, wherein each sub-graph corresponds to a different one of the plurality of systems. From each sub-graph, a portion of high-level language (HLL) program code can be generated. Each portion of HLL program code may be specific to the system corresponding to the sub-graph from which the portion of HLL program code was generated.

20 Claims, 9 Drawing Sheets

(56) References Cited

U.S. PATENT DOCUMENTS

2013/0091482 A1* 4/2013 Carrion ................ G06F 30/327
716/132
2019/0138373 A1* 5/2019 Nicol .................... G06F 9/3005
2020/0371759 A1 11/2020 Sastry et al.
2020/0372123 A1 11/2020 Gupta et al.

OTHER PUBLICATIONS

Luk W et al: "A high-level compilation toolchain for heterogeneous systems", SOC Conference, 2009. SOCC 2009. IEEE International, IEEE, Piscataway, NJ, USA, Sep. 9, 2009 (Sep. 9, 2009), pp. 9-18.

* cited by examiner

800

Convert a model, created as a data structure using a modeling system, into a data flow graph, wherein the model represents a design for implementation in an integrated circuit having a plurality of systems, the systems being heterogeneous
802

Classify nodes of the data flow graph for implementation in different ones of the plurality of systems of the integrated circuit
804

Partition the data flow graph into a plurality of sub-graphs based on the classifying, wherein each sub-graph corresponds to a different one of the plurality of systems
806

Generate, from each sub-graph, a portion of high-level language (HLL) program code, wherein each portion of the HLL program code is specific to the system corresponding to the sub-graph from which the portion of the HLL program code was generated.
808

FIG. 8

MODEL-BASED DESIGN AND PARTITIONING FOR HETEROGENEOUS INTEGRATED CIRCUITS

RESERVATION OF RIGHTS IN COPYRIGHTED MATERIAL

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This disclosure relates to integrated circuits (ICs) and, more particularly, to model-based design and partitioning for heterogeneous ICs.

BACKGROUND

ICs can be implemented to perform a variety of functions. Some ICs can be programmed to perform specified functions. One example of an IC that can be programmed is a field programmable gate array (FPGA). An FPGA typically includes an array of programmable tiles. The programmable tiles are collectively referred to as programmable logic. Examples of the programmable tiles may include, but are not limited to, input/output blocks (IOBs), configurable logic blocks (CLBs), dedicated random access memory blocks (BRAM), multipliers, digital signal processing blocks (DSPs), clock managers, delay lock loops (DLLs), and so forth.

Computer-based modeling environments are available in which users may create models of electronic systems. The users create the models by insert model blocks into the design environment using a graphical drag-and-drop paradigm. Users connect the model blocks to define data flows among the model blocks. The modeling environment is capable of processing the model to generate a Register Transfer Level (RTL) representation of the model that may be further processed for implementation in programmable logic of an IC.

Modern ICs, however, have evolved to include multiple different types of systems on the same chip. These multiple different systems may include programmable logic, hardwired processors, and the like. Available modeling environments, however, are limited to model creation targeted to programmable logic. Available modeling environments lack mechanisms for contending with the other types of systems available on modern ICs.

SUMMARY

In one aspect, a method can include converting a model, created as a data structure using a modeling system, into a data flow graph. The model represents a design for implementation in an IC having a plurality of systems. The systems are heterogeneous. The method can include classifying nodes of the data flow graph for implementation in different ones of the plurality of systems of the IC and partitioning the data flow graph into a plurality of sub-graphs based on the classifying. Each sub-graph corresponds to a different one of the plurality of systems. The method also can include generating, from each sub-graph, a portion of high-level language (HLL) program code. Each portion of HLL program code is specific to the system corresponding to the sub-graph from which the portion of HLL program code was generated.

In another aspect, a system includes a processor configured to initiate operations. The operations can include converting a model, created as a data structure using a modeling system, into a data flow graph. The model represents a design for implementation in an IC having a plurality of systems. The systems are heterogeneous. The operations can include classifying nodes of the data flow graph for implementation in different ones of the plurality of systems of the IC and partitioning the data flow graph into a plurality of sub-graphs based on the classifying. Each sub-graph corresponds to a different one of the plurality of systems. The operations also can include generating, from each sub-graph, a portion of HLL program code, wherein each portion of HLL program code is specific to the system corresponding to the sub-graph from which the portion of HLL program code was generated.

In another aspect, a computer program product includes one or more computer readable storage media, and program instructions collectively stored on the one or more computer readable storage media. The program instructions are executable by computer hardware to initiate operations. The operations can include converting a model, created as a data structure using a modeling system, into a data flow graph. The model represents a design for implementation in an IC having a plurality of systems. The systems are heterogeneous. The operations can include classifying nodes of the data flow graph for implementation in different ones of the plurality of systems of the IC and partitioning the data flow graph into a plurality of sub-graphs based on the classifying. Each sub-graph corresponds to a different one of the plurality of systems. The operations also can include generating, from each sub-graph, a portion of HLL program code, wherein each portion of HLL program code is specific to the system corresponding to the sub-graph from which the portion of HLL program code was generated.

This Summary section is provided merely to introduce certain concepts and not to identify any key or essential features of the claimed subject matter. Other features of the inventive arrangements will be apparent from the accompanying drawings and from the following detailed description.

BRIEF DESCRIPTION OF THE DRAWINGS

The inventive arrangements are illustrated by way of example in the accompanying drawings. The drawings, however, should not be construed to be limiting of the inventive arrangements to only the particular implementations shown. Various aspects and advantages will become apparent upon review of the following detailed description and upon reference to the drawings.

FIG. 8 illustrates an example method of implementing a model within a target IC having a plurality of heterogeneous systems.

DETAILED DESCRIPTION

Figure 1:
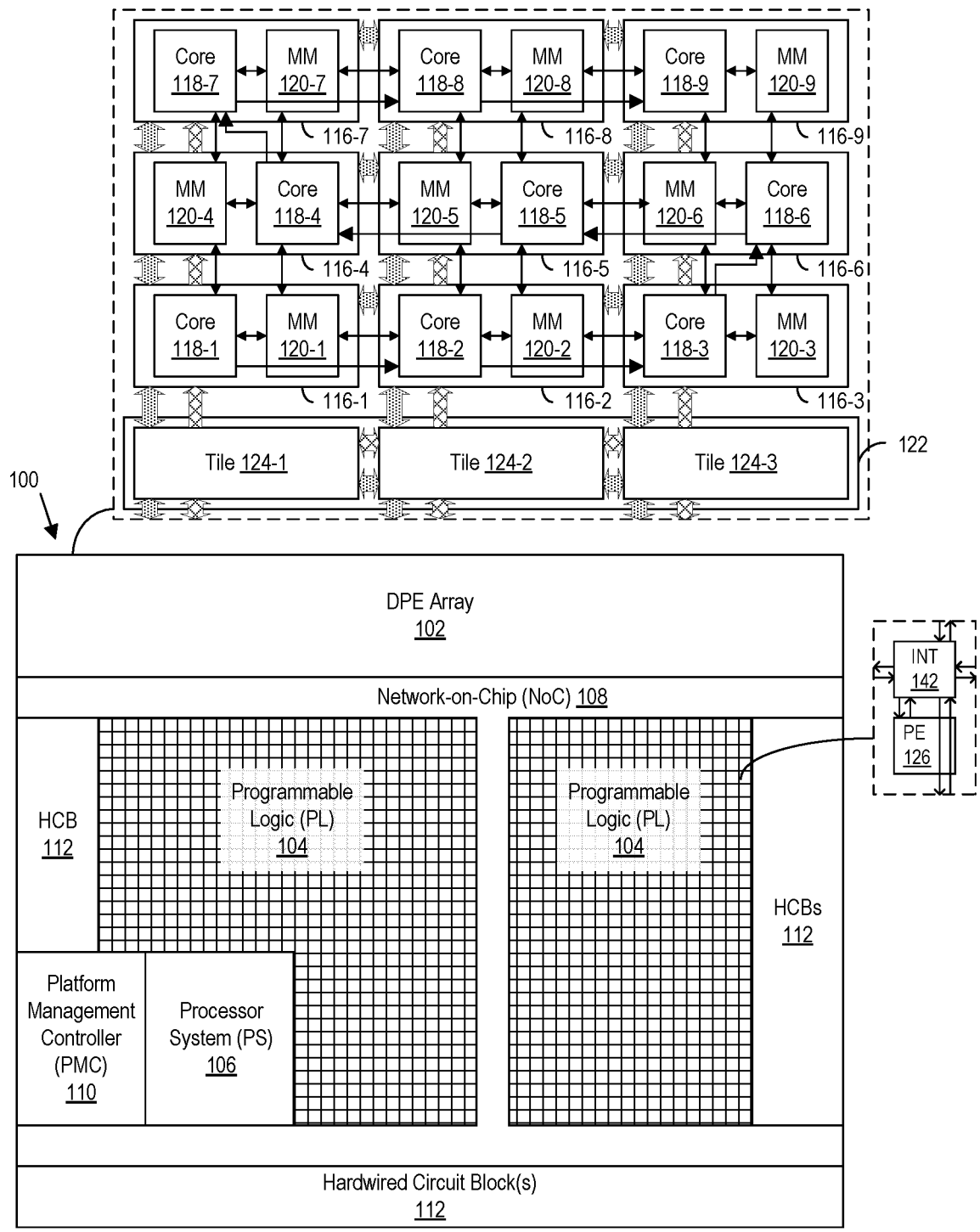
FIG. 1 illustrates an example IC having a plurality of heterogeneous systems.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to ICs and, more particularly, to model-based design and partitioning for heterogeneous ICs. A heterogeneous IC refers to an IC that includes a plurality of different, or heterogeneous, systems. In accordance with the inventive arrangements described within this disclosure, systems, methods, and computer program products are provided that are capable of creating a model for an electronic system and implementing the model within an IC having a plurality of heterogeneous systems.

In general, a modeling system refers to a computer-based modeling environment in which a user may create a model of an electronic system. The modeling system may include a model-based design tool that executes in cooperation with the modeling environment. The model-based design tool augments the functionality of the modeling environment so that models may be realized in a particular IC referred to as the "target IC." The user may insert model blocks into a design environment provided by the modeling system. The model blocks may be inserted using a graphical drag-and-drop paradigm. The model blocks represent particular functions or operations that, ultimately, are implemented by circuits in the target IC. The user may also connect the model blocks within the design environment to establish signal and/or data flows among the model blocks.

An example of a modeling environment is MATLAB used in combination with SIMULINK. Both MATLAB and SIMULINK are available from The Mathworks, Inc. of Natick, Mass. Such a modeling environment is capable of executing further applications as part of the modeling environment. For example, the modeling environment may execute an application such as Model Composer available from Xilinx, Inc. of San Jose, Calif. Model Composer is an example of a model-based design tool that facilitates design and exploration of models intended for implementation in an IC. Using a model-based design tool, for example, the user has access to a library of model blocks that correspond to different cores, or circuits, that may be implemented in the IC.

In accordance with the inventive arrangements described within this disclosure, a model may be created using a modeling system, where the model is intended for implementation in an IC that has a plurality of heterogeneous systems. These different systems may include programmable logic as one of the systems. Further, the different systems may operate cooperatively with one another. For purposes of illustration, examples of different systems that may be available in an IC can include, but are not limited to, programmable logic, a data processing engine (DPE) array, and/or a processor system. The processor system may include one or more hardwired processors. The hardwired processors may be dissimilar. One or more or all of the systems of the IC may be interconnected by on-chip interconnects. In one aspect, the different systems may be interconnected by a further system referred to as a Network-on-Chip (NoC). These systems may be included in an IC in varying combinations.

In the usual case, to program an IC having multiple heterogeneous systems, developers or system designers have had to acquire knowledge and skills in different areas such as hardware programming, software development, architectural exploration, and system partitioning. Typically, software developers are not trained in these different areas, which are necessary to implement a model within an IC having multiple, heterogeneous systems. Similarly, domain-specific application engineers, algorithm developers, and system architects may have little or no expertise in software development, hardware programming, and/or partitioning a model for implementation in an IC having multiple, heterogeneous systems. Further, available modeling systems are limited to implementing models in homogeneous ICs. For example, available modeling systems have been limited to implementing models within programmable logic of an FPGA.

Within this disclosure, example implementations of a modeling system are disclosed having functionality that extends beyond creating models for implementation in programmable logic. In accordance with the inventive arrangements described within this disclosure, systems, methods, and computer program products are provided that extend the functionality of modeling systems to create and implement models within modern ICs that include a variety of different types of systems.

In one or more example implementations, systems, methods, and computer program products are provided that are capable of performing operations such as partitioning a model into different portions each corresponding to a different system of the target IC. The model may be executed and simulated to verify functional correctness, verify design rule checks, verify port interface connections between the various model blocks and/or target systems in the target IC, and verify configurations of the model blocks with respect to the target hardware in the target IC. The inventive arrangements provide a modeling system in which a user is capable of exploring different design solutions and/or algorithms, simulating the model, verifying functional correctness of the model, different portions of the model corresponding to different systems of the target IC, and/or observing dynamic behavior of the model or portions thereof during simulation. These operations may be performed across the different systems available in the IC.

Further aspects of the inventive arrangements are described below in greater detail with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

FIG. 1 illustrates an example IC 100 having a plurality of heterogeneous systems. IC 100 is an example of a programmable IC and an adaptive system. In one aspect, IC 100 is also an example of a System-on-Chip (SoC). In the example of FIG. 1, IC 100 is implemented on a single die provided within a single integrated package. In other examples, IC 100 may be implemented using a plurality of interconnected dies where the various programmable circuit resources illustrated in FIG. 1 are implemented across the different interconnected dies.

As noted, IC 100 includes a plurality of heterogeneous systems. The systems include a data processing engine (DPE) array 102, programmable logic 104, a processor system 106, and a Network-on-Chip (NoC) 108. IC 100 may also include one or more other systems such as a platform management controller (PMC) 110 and one or more hardwired circuit blocks 112.

DPE array 102 is implemented as a plurality of interconnected and programmable DPEs 116. DPEs 116 may be arranged in an array and are hardwired. Each DPE 116 can include one or more cores 118 and a memory module (abbreviated "MM" in FIG. 1) 120. In one aspect, each core 118 is capable of executing program code stored in a core-specific program memory contained within each respective core (not shown). Each core 118 is capable of directly accessing the memory module 120 within the same DPE 116 and the memory module 120 of any other DPE 116 that is adjacent to the core 118 of the DPE 116 in the up, down, left, and right directions. For example, core 118-5 is capable of directly reading and/or writing (e.g., via respective memory interfaces not shown) memory modules 120-5, 120-8, 120-6, and 120-2. Core 118-5 sees each of memory modules 120-5, 120-8, 120-6, and 120-2 as a unified region of memory (e.g., as a part of the local memory accessible to core 118-5). This facilitates data sharing among different DPEs 116 in DPE array 102. In other examples, core 118-5 may be directly connected to memory modules 120 in other DPEs.

DPEs 116 are interconnected by programmable DPE interconnect circuitry. The programmable DPE interconnect circuitry may include one or more different and independent networks. For example, the programmable DPE interconnect circuitry may include a streaming network formed of streaming connections (shaded arrows), a memory mapped network formed of memory mapped connections (cross-hatched arrows).

In one or more example implementations, certain connections between circuit components described within this specification may be implemented using hardware and/or circuitry compatible with the Advanced Microcontroller Bus Architecture (AMBA) eXtensible Interface (AXI) (hereafter "AXI") protocol. AXI defines an embedded microcontroller bus interface for use in establishing on-chip connections between compliant circuit blocks and/or systems. The connections may be streaming (e.g., AXI-S) connections, memory mapped (AXI-MM) connections, or control connections and/or interfaces (AXI-L). AXI is provided as an illustrative example of a bus interface that may be used to establish on-chip connections and is not intended as a limitation of the examples described within this disclosure. It should be appreciated that other similar and/or equivalent protocols, communication buses, bus interfaces, and/or interconnects may be used in lieu of AXI and that the various example circuit blocks and/or signals provided within this disclosure will vary based on the particular protocol, communication bus, bus interface, and/or interconnect that is used.

Loading configuration data into control registers of DPEs 116 by way of the memory mapped connections allows each DPE 116 and the components therein to be controlled independently. DPEs 116 may be enabled/disabled on a per-DPE basis. Each core 118, for example, may be configured to access the memory modules 120 as described or only a subset thereof to achieve isolation of a core 118 or a plurality of cores 118 operating as a cluster. Each streaming connection may be configured to establish logical connections between only selected ones of DPEs 116 to achieve isolation of a DPE 116 or a plurality of DPEs 116 operating as a cluster. Because each core 118 may be loaded with program code specific to that core 118, each DPE 116 is capable of implementing one or more different kernels therein.

In other aspects, the programmable DPE interconnect circuitry within DPE array 102 may include additional independent networks such as a debug network that is independent (e.g., distinct and separate from) the streaming connections and the memory mapped connections, and/or an event broadcast network. In some aspects, the debug network is formed of memory mapped connections and/or is part of the memory mapped network.

Cores 118 may be directly connected with adjacent cores 118 via core-to-core cascade connections. In one aspect, core-to-core cascade connections are unidirectional and direct connections between cores 118 as pictured. In another aspect, core-to-core cascade connections are bidirectional and direct connections between cores 118. In general, core-to-core cascade connections generally allow the results stored in an accumulation register of a source core to be provided directly to an input of a target or load core. Activation of core-to-core cascade interfaces may also be controlled by loading configuration data into control registers of the respective DPEs 116.

In an example implementation, DPEs 116 do not include cache memories. By omitting cache memories, DPE array 102 is capable of achieving predictable, e.g., deterministic, performance. Further, significant processing overhead is avoided since maintaining coherency among cache memories located in different DPEs 116 is not required. In a further example, cores 118 do not have input interrupts. Thus, cores 118 are capable of operating uninterrupted. Omitting input interrupts to cores 118 also allows DPE array 102 to achieve predictable, e.g., deterministic, performance.

SoC interface block 122 operates as an interface that connects DPEs 116 to other resources of IC 100. In the example of FIG. 1, SoC interface block 122 includes a plurality of interconnected tiles 124 organized in a row. In particular embodiments, different architectures may be used to implement tiles 124 within SoC interface block 122 where each different tile architecture supports communication with different resources of IC 100. Tiles 124 are connected so that data may be propagated from one tile to another bi-directionally. Each tile 124 is capable of operating as an interface for the column of DPEs 116 directly above.

Tiles 124 are connected to adjacent tiles, to DPEs 116 immediately above, and to circuitry below using the streaming connections and the memory mapped connections as shown. Tiles 124 may also include a debug network that connects to the debug network implemented in DPE array 102. Each tile 124 is capable of receiving data from another source such as processor system 106, programmable logic 104, and/or another hardwired circuit block 112. Tile 124-1, for example, is capable of providing those portions of the data, whether application or configuration, addressed to DPEs 116 in the column above to such DPEs 116 while sending data addressed to DPEs 116 in other columns on to other tiles 124, e.g., 124-2 or 124-3, so that such tiles 124 may route the data addressed to DPEs 116 in their respective columns of DPEs accordingly.

In one aspect, SoC interface block 122 includes two different types of tiles 124. A first type of tile 124 has an architecture configured to serve as an interface only between DPEs 116 and programmable logic 104. A second type of tile 124 is has an architecture configured to serve as an interface between DPEs 116 and NoC 108 and also between DPEs 116 and programmable logic 104. SoC interface block 122 may include a combination of tiles of the first and second types or tiles of only the second type.

Programmable logic 104 is circuitry that may be programmed to perform specified functions. As an example, programmable logic 104 may be implemented as field programmable gate array type of circuitry. Programmable logic 104 can include an array of programmable circuit blocks. As defined herein, the term "programmable logic" means circuitry used to build reconfigurable digital circuits. Programmable logic is formed of many programmable circuit blocks sometimes referred to as "tiles" that provide basic functionality. The topology of programmable logic 104 is highly configurable unlike hardwired circuitry. Each programmable circuit block of programmable logic 104 typically includes a programmable element 126 (e.g., a functional element) and a programmable interconnect 142. The programmable interconnects 142 provide the highly configurable topology of programmable logic 104. The programmable interconnects 142 may be configured on a per wire basis to provide connectivity among the programmable elements 126 of programmable circuit blocks of programmable logic 104 and is configurable on a per-bit basis (e.g., where each wire conveys a single bit of information) unlike connectivity among DPEs 116, for example.

Examples of programmable circuit blocks of programmable logic 104 include CLBs having look-up tables and registers. Unlike hardwired circuitry described below and sometimes referred to as hard blocks, these programmable circuit blocks have an undefined function at the time of manufacture. Programmable logic 104 may include other types of programmable circuit blocks that also provide basic and defined functionality with more limited programmability. Examples of these circuit blocks may include DPSs, phase lock loops (PLLs), and BRAMs. These types of programmable circuit blocks, like others in programmable logic 104, are numerous and intermingled with the other programmable circuit blocks of programmable logic 104. These circuit blocks may also have an architecture that generally includes a programmable interconnect 142 and a programmable element 126 and, as such, are part of the highly configurable topology of programmable logic 104.

Prior to use, programmable logic 104, e.g., the programmable interconnect and the programmable elements, must be programmed or "configured" by loading data referred to as a configuration bitstream into internal configuration memory cells therein. The configuration memory cells, once loaded with a configuration bitstream, define how programmable logic 104 is configured, e.g., the topology, and operates (e.g., particular functions performed). Programmable logic 104 may have multiple connection points to NoC 108.

Processor system 106 is implemented as hardwired circuitry that is fabricated as part of IC 100. Processor system 106 may be implemented as, or include, any of a variety of different processor types each capable of executing program code. For example, processor system 106 may be implemented as an individual processor, e.g., a single core capable of executing program code. In another example, processor system 106 may be implemented as a multi-core processor. In still another example, processor system 106 may include one or more processors, modules, co-processors, I/O interfaces, and/or other resources. Processor system 106 may be implemented using any of a variety of different types of architectures. Example architectures that may be used to implement processor system 106 may include, but are not limited to, an ARM processor architecture, an x86 processor architecture, a graphics processing unit (GPU) architecture, a mobile processor architecture, a DSP architecture, combinations of the foregoing architectures, or other suitable architecture that is capable of executing computer-readable instructions or program code. Processor system 106 may have multiple connection points to NoC 108.

In an example implementation, processor system 106 may be implemented as, or include, any of a variety of different processor types each capable of executing program code. The processors may have different architectures and/or instruction sets. In one example implementation, processor system 106 may include various processors such as one or more real-time processing units (RPUs), one or more application processing units (APUs), and/or one or more GPUs, each capable of executing program code. Processor system 106 also may include various support circuits. Examples of support circuits may include, but are not limited to, on-chip memory (OCM), transceivers, peripherals, interconnects, direct memory access circuit(s), a memory controller, and/or a multiplexed input/output circuit that couples to other systems of IC 100. Within processor system 106, the processors and the support circuits may be interconnected by the interconnect.

NoC 108 is a programmable interconnecting network for sharing data between endpoint circuits in IC 100. The endpoint circuits can be disposed in DPE array 102, programmable logic 104, processor system 106, and/or selected hardwired circuit blocks 112. NoC 108 can include high-speed data paths with dedicated switching. In an example, NoC 108 includes one or more horizontal paths, one or more vertical paths, or both horizontal and vertical path(s). The arrangement and number of regions shown in FIG. 1 is merely an example. NoC 108 is an example of the common infrastructure that is available within IC 100 to connect selected components and/or subsystems.

Within NoC 108, the nets that are to be routed through NoC 108 are unknown until a user circuit design is created for implementation within IC 100. NoC 108 may be programmed by loading configuration data into internal configuration registers that define how elements within NoC 108 such as switches and interfaces are configured and operate to pass data from switch to switch and among the NoC interfaces to connect the endpoint circuits. NoC 108 is fabricated as part of IC 100 (e.g., is hardwired) and, while not physically modifiable, may be programmed to establish connectivity between different master circuits and different slave circuits of a user circuit design. NoC 108, upon power-on, may not implement any data paths or routes therein. Once configured by PMC 110, however, NoC 108 may implement data paths or routes between endpoint circuits.

PMC 110 is responsible for managing IC 100. PMC 110 is a system within IC 100 that is capable of managing the other programmable circuit resources across the entirety of IC 100. PMC 110 is capable of maintaining a safe and secure environment, booting IC 100, and managing IC 100 during normal operations. For example, PMC 110 is capable of providing unified and programmable control over power-up, boot/configuration, security, power management, safety monitoring, debugging, and/or error handling for the different programmable circuit resources of IC 100 (e.g., DPE array 102, programmable logic 104, processor system 106, and NoC 108). PMC 110 operates as a dedicated platform manager that decouples processor system 106 and from programmable logic 104. As such, processor system 106 and programmable logic 104 may be managed, configured, and/or powered on and/or off independently of one another.

In one aspect, PMC 110 is capable of operating as a Root-of-Trust for the entirety of IC 100. As an example, PMC 110 is responsible for authenticating and/or validating device images containing configuration data for any of the programmable resources of IC 100 that may be loaded therein. PMC 110 further is capable of protecting IC 100 against tampering during operation. By operating as the Root-of-Trust for IC 100, PMC 110 is capable of monitoring operation of programmable logic 104, processor system 106, and/or any other programmable circuit resources that may be included in IC 100. The Root-of-Trust capabilities, as performed by PMC 110, are distinct and separate from processor system 106 and programmable logic 104 and/or any operations performed by the processor system 106 and/or programmable logic 104.

Hardwired circuit blocks 112 include special-purpose circuit blocks fabricated as part of IC 100. Though hardwired, hardwired circuit blocks 112 may be configured by loading configuration data into control registers to implement one or more different modes of operation. Examples of hardwired circuit blocks 112 may include input/output (I/O) blocks, transceivers for sending and receiving signals to circuits and/or systems external to IC 100, memory controllers, or the like. Examples of different I/O blocks may include single-ended and pseudo differential I/Os. Examples of transceivers may include high-speed differentially clocked transceivers. Other examples of hardwired circuit blocks 112 include, but are not limited to, cryptographic engines, digital-to-analog converters (DACs), analog-to-digital converters (ADCs), and the like. In general, hardwired circuit blocks 112 are application-specific circuit blocks.

The various programmable circuit resources illustrated in FIG. 1 may be programmed initially as part of a boot process for IC 100. During runtime, the programmable circuit resources may be reconfigured. In one aspect, PMC 110 is capable of initially configuring DPE array 102, programmable logic 104, processor system 106, and NoC 108. At any point during runtime, PMC 110 may reconfigure all or a portion of IC 100. In some cases, processor system 106 may configure and/or reconfigure programmable logic 104 and/or NoC 108 once initially configured by PMC 110.

Figure 2:
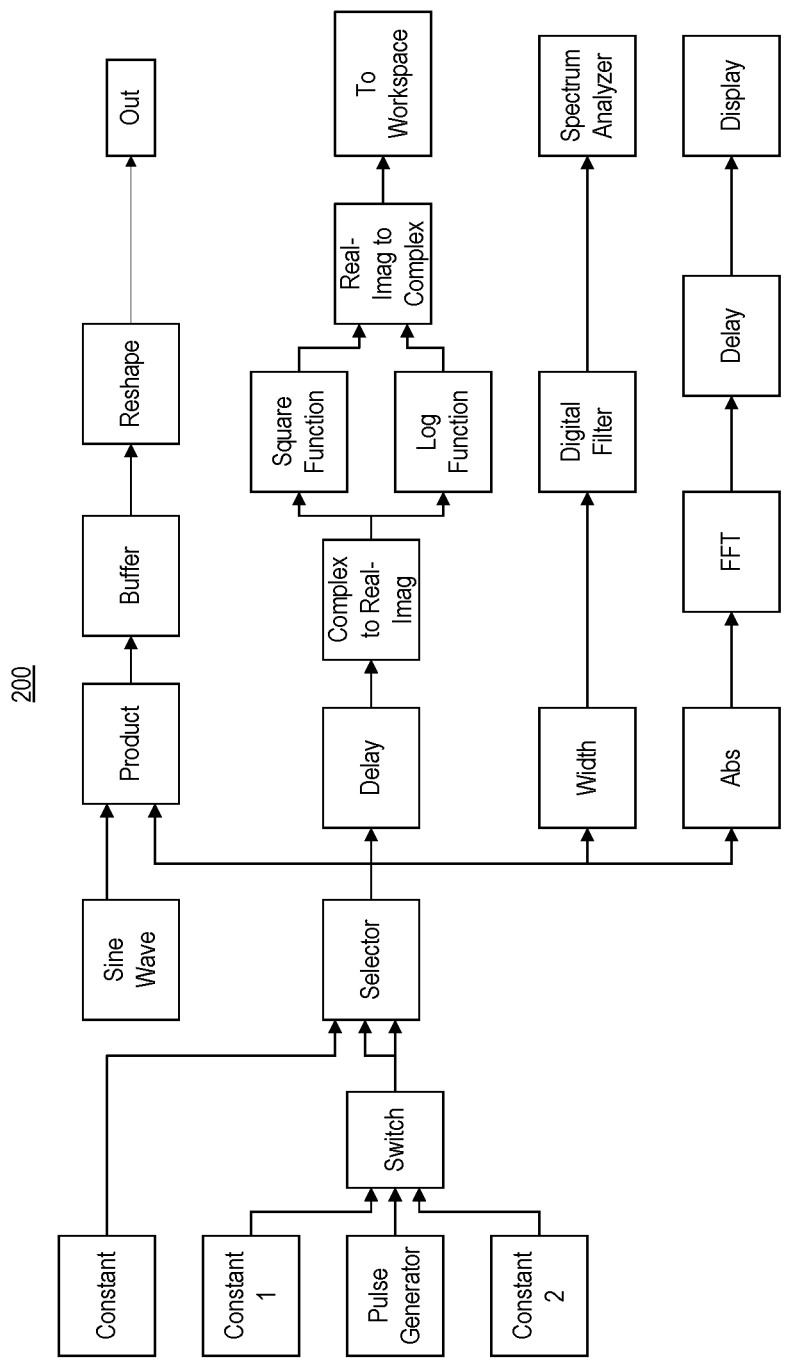
FIG. 2 illustrates an example model created using a modeling system.

FIG. 2 illustrates an example model 200 created using a modeling system. Within this disclosure, the term "modeling system" means a computer or other data processing system that is configured to execute a modeling environment and a model-based design tool. An example of a computer and/or data processing system that may be used as a modeling system is described in connection with FIG. 9.

The model-based design tool of the modeling system provides a high-level design abstraction as a model block library for a target IC. Each model block may have a corresponding, built-in, HLL software model that is executable. The HLL software models of the model blocks may be specified in C and/or C++ program code, as MATLAB scripts, or as other high-level program code and/or scripts. Accordingly, a model, implemented as a data structure, may be constructed of model blocks. The model is executable within the modeling environment to accelerate simulation and guarantee functionally correct, bit-accurate simulation results for hardware generated from the model.

Model 200 includes a plurality of model blocks. Connections between model blocks are shown as arrows. Connections represent data flows or signals exchanged between the model blocks. A user may create model 200 within the graphical programming environment provided by the modeling system using a drag-and-drop paradigm, which differs from other techniques for creating circuit designs where the user must write structured, complex program code in a text-based language.

Model 200 may be executed by the modeling system, which allows model 200 to be interactively simulated. Results from the simulation may be viewed on scopes and graphical displays of the modeling system to verify functional correctness and dynamic behavior of any hardware generated from model 200 at an early stage of development (e.g., prior to generation of such hardware). Through simulation, model 200 may be refined to ensure that any hardware generated from model 200 will meet established design specifications. Further, simulation of model 200 facilitates design rule checks, validation of port interface connections, and validation of block configurations for the target hardware.

For purposes of illustration, model 200 represents an electronic system that is to be implemented in an IC having a plurality of heterogeneous systems. An example of such an IC is IC 100 of FIG. 1. Accordingly, as an example, different model blocks of model 200 may be implemented in DPE array 102, programmable logic 104, and/or processor system 106.

Figure 3:
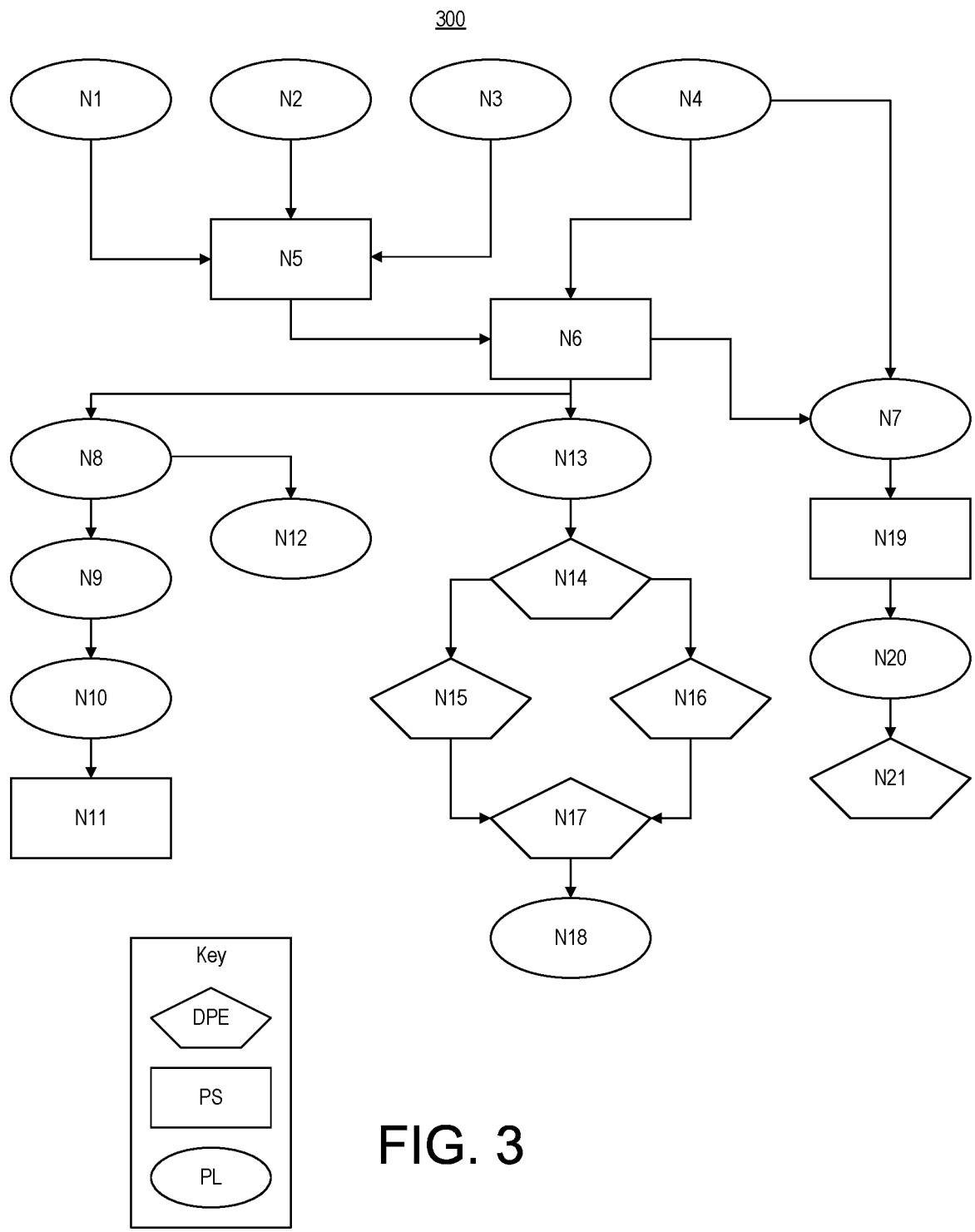
FIG. 3 illustrates an example of a data flow graph generated by a modeling system.

FIG. 3 illustrates an example data flow graph 300 generated by a modeling system. Data flow graph 300 may be implemented as a data structure. For example, the modeling system is capable of converting a model of an electronic system, e.g., model 200 of FIG. 2, into a data flow graph such as data flow graph 300 of FIG. 3. In one aspect, each model block of the model corresponds to one or more nodes in data flow graph 300. Connections of the model are represented as directed edges in data flow graph 300.

In one aspect, the modeling system generate the data flow graph by first creating an initial data flow graph that represents the model on a node for node basis. The modeling system is capable of transforming and/or optimizing the initial data flow graph in a variety of ways. In one example implementation, the modeling system is capable of sorting or ordering the nodes of the initial data flow graph based on node dependencies. Based on the sorted nodes, the modeling system is capable of generating an intermediate data flow graph representation for further processing and optimization.

The modeling system also is capable of classifying nodes of the data flow graph into different groups, where each group corresponds to one of the systems of the target IC. The classification may be performed on the intermediate data flow graph. In one aspect, as part of the classification, the modeling system is capable of automatically labeling each node for implementation in a particular system of the target IC. In the example of FIG. 3, the nodes of data flow graph 300 have different shapes that correspond to different systems (e.g., the labels) of the target IC. Each different shape corresponds to a particular system of the target IC.

For example, nodes that are rectangular in shape represent functions that are to be implemented in software and executed by one or more of the processors of processor system 106. Each rectangular shaped node represents one or more nodes from the model that perform control operations or processor-specific operations that may be implemented in software.

Nodes that are oval in shape represent functions that are to be implemented in programmable logic 104. Each oval shaped node represents one or more nodes from the model that represent computationally intense operations or accelerated operations that are to be implemented using programmable logic 104. Nodes that are shaped as a pentagon represent functions that are to be implemented by DPEs in DPE array 102. For example, each pentagon shaped node may be implemented in program code executed by a core of a particular DPE within DPE array 102. Each pentagon shaped node represents one or more nodes from the model.

In one aspect, the modeling system is capable of automatically classifying the nodes of the data flow graph based on one or more attributes of the particular model block(s) from which each node of the data flow graph is derived. Examples of attributes used by the modeling system for classification of nodes of the data flow graph may include, but are not limited to, functionality, connectivity, implementation characteristics, portability, power constraints, application context, or other hardware requirements. Certain nodes may also have an attribute designating the node as a control node.

For purposes of illustration, consider a node of the data flow graph representing a filter model block from the model. As part of the design process in the modeling system, the filter model block may have one or more attributes assigned thereto that specify any of a variety of operational parameters and/or requirements for the model block. Examples of the attributes may include, but are not limited to, a desired operating or clock frequency, a desired data throughput for the model block, a power constraint (e.g., defining a maximum power consumption limitation), or the like. The attributes of the model block may be carried forward and assigned to the node of the data flow graph representing the model block. In some cases, attributes are assigned to individual model blocks, while in other cases attributes are assigned to entire subsystems, e.g., groups of two or more model blocks, of the model.

The modeling system is capable of storing one or more system preferences in memory that dictate how to implement the model blocks and/or subsystems of the model. By performing a comparison of the attribute(s) of the model block(s) and/or subsystem(s) with the corresponding system preferences, the modeling system is capable of classifying nodes of the data flow graph automatically. That is, the modeling system is capable of creating a node of the data flow graph from one or more model blocks of the model and classify the node based on the attributes of the model block(s) represented by the node.

Consider an example where the modeling system stores a system preference defining a clock frequency threshold as 500 MHz for a filter model block. The modeling system is capable of comparing a clock frequency attribute specifying a desired clock frequency for the model block within the model with the system preference for the filter model block. The modeling system is capable of classifying the node of the data flow graph representing the filter model block as one intended for implementation in the programmable logic in response to determining that the clock frequency attribute of the model block is less than or equal to the system preference. The modeling system is capable of classifying the node of the data flow graph representing the filter model block as one intended for implementation in the DPE array in response to determining that the clock frequency attribute of the model block is greater than the system preference.

The modeling system is capable of performing similar analysis with respect to other system preferences and other attributes of nodes carried forward from the underlying model block(s) relating to power, data throughput, and the like. For example, for those model blocks that may be implemented in either the programmable logic or the DPE array, the corresponding nodes of the data flow graph having a data throughput attribute that is greater than the relevant system preference may be classified as nodes to be implemented in the DPE array, while those nodes having a data throughput attribute that less than or equal to the relevant system preference may be classified as nodes to be implemented in the programmable logic. Similarly, for model blocks that may be implemented in either the programmable logic or the DPE array, the corresponding nodes having a power consumption attribute (e.g., power constraint) greater than the relevant system preference may be classified as nodes to be implemented in the DPE array, while those nodes having a power consumption attribute less than or equal to the relevant system preference may be classified as nodes to be implemented in the programmable logic.

In general, the DPE array is capable of achieving higher data throughput, higher operating frequencies, and lower power consumption than the programmable logic. These characteristics of the DPE array and programmable logic may be used by the modeling system when performing the classification of nodes of the data flow graph.

In other examples, the nodes representing certain model blocks may be classified by the modeling system in a predetermined manner for implementation in the processing system, the programmable logic, or the DPE array. For example, a node may represent a model block having a "control" attribute. That node may be automatically classified as one intended for implementation in the processor system.

While different examples where the modeling system automatically classifies nodes of the data flow graph are described, in other example implementations, users may manually specify the particular system in which a given model block is to be implemented. In that case, any such manual designations may override any automated determinations made by the modeling system. The modeling system may classify the nodes in a manner that is consistent with the manually specified designations.

Figure 4:
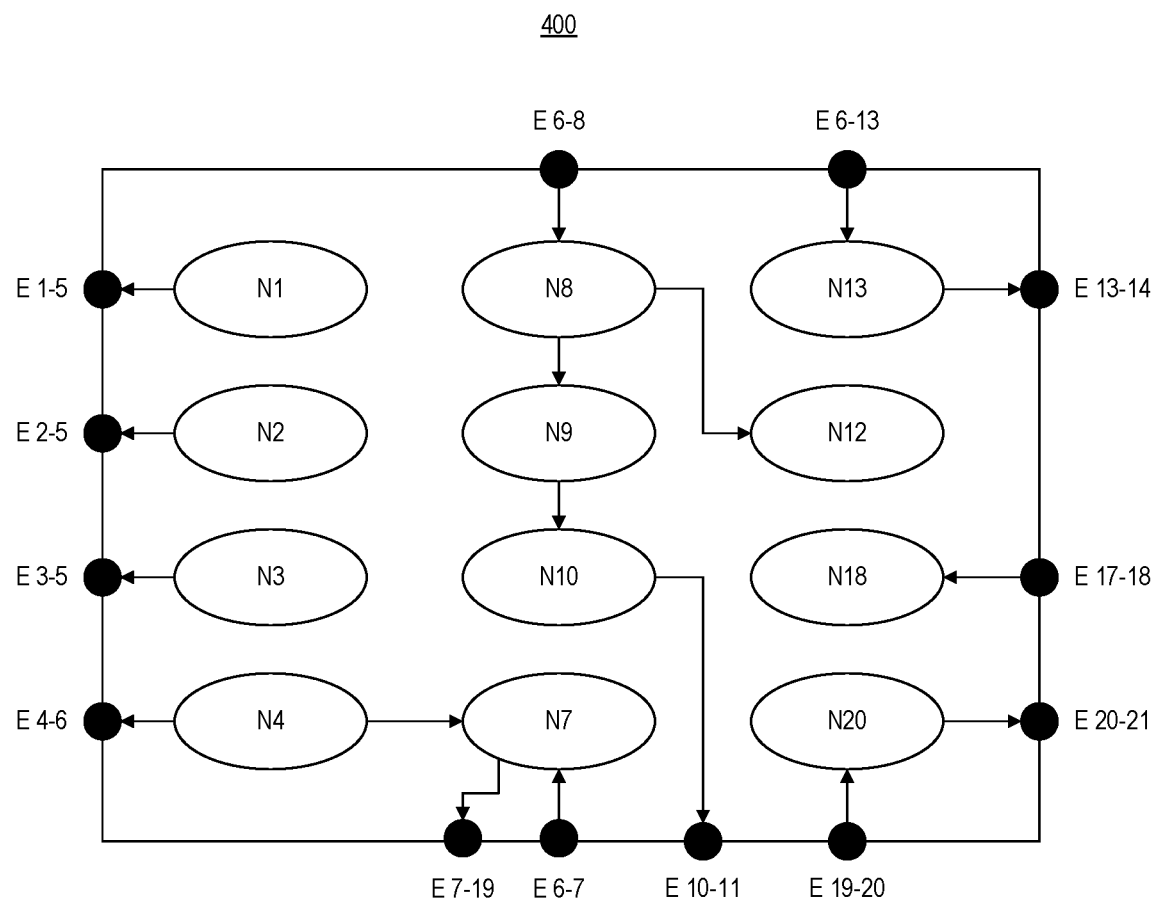
FIG. 4 illustrates an example of a sub-graph corresponding to programmable logic of a target IC.
Figure 5:
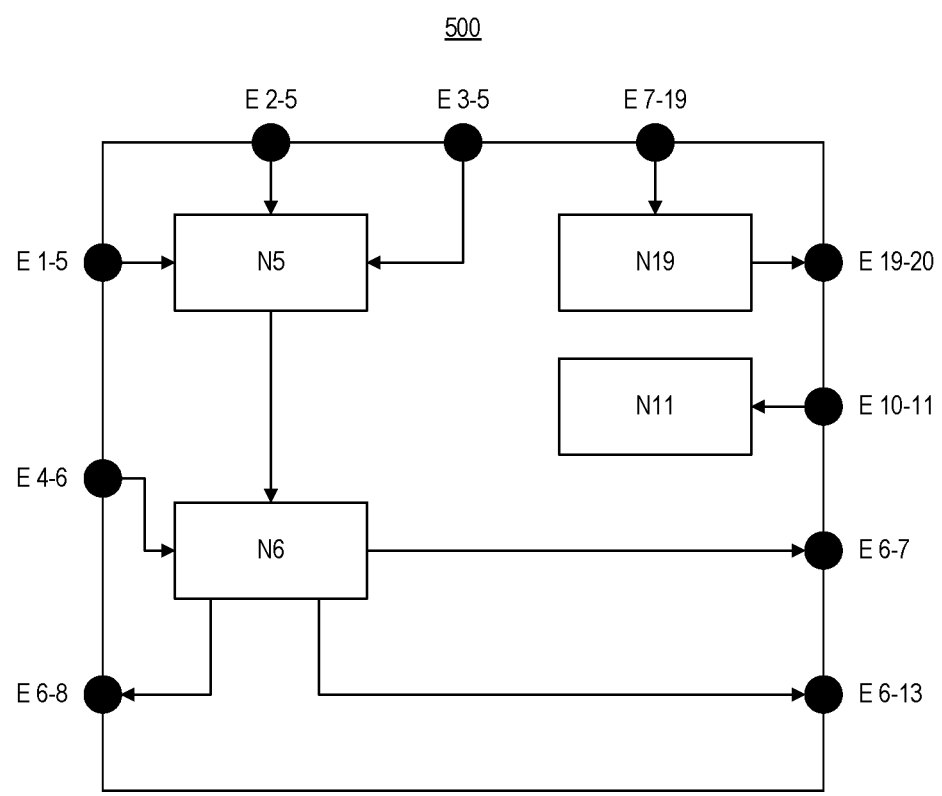
FIG. 5 illustrates an example of a sub-graph corresponding to the processor system of the target IC.
Figure 6:
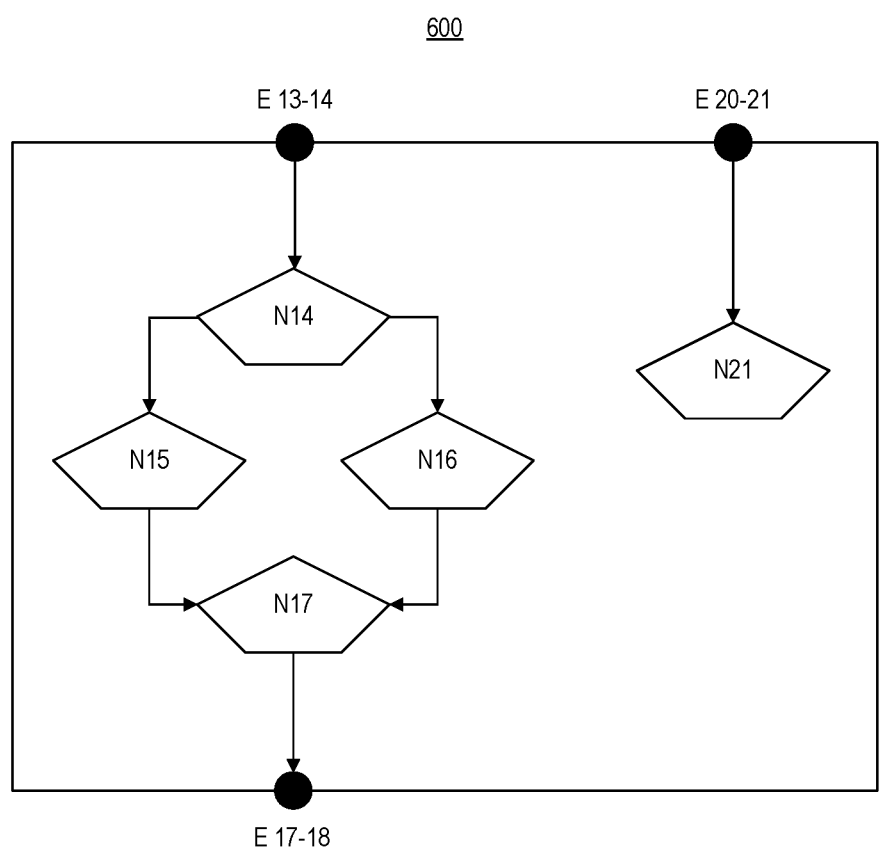
FIG. 6 illustrates an example of a sub-graph corresponding to the data processing engine array of the target IC.

FIGS. 4-6 illustrate an example of partitioning a data flow graph into a plurality of sub-graphs. FIGS. 4-6 each illustrates an example sub-graph generated from the example data flow graph of FIG. 3. Each of the sub-graphs illustrated in FIGS. 4-6 corresponds to a different one of the systems of the target IC. For example, the modeling system is capable of clustering the nodes of a given data flow graph S (e.g., data flow graph 300) into subgraphs S1, S2, and S3 based on the classification of nodes performed and open edges to maintain functional characteristics and interconnections among the nodes. The modeling system is capable of generating one sub-graph for each different system of the target IC represented in the data flow graph.

FIG. 4 illustrates an example sub-graph 400. Sub-graph 400 includes each of the nodes classified as being intended for implementation in the programmable logic. In creating sub-graph 400, the connectivity among the nodes included in the sub-graph is preserved. For those nodes in sub-graph 400 that connect to nodes not included in sub-graph 400, such nodes are connected to a port of sub-graph 400. For example, node N18 is connected to port E 17-18. Node N20 is connected to ports E 19-20 and E 20-21.

FIG. 5 illustrates an example sub-graph 500. Sub-graph 500 includes each of the nodes classified as being intended for implementation in the processor system. In creating sub-graph 500, the connectivity among the nodes included in the sub-graph is preserved. For those nodes in sub-graph 500 that connect to nodes not included in sub-graph 500, such nodes are connected to port(s) of sub-graph 500. For example, node N5 is connected to port N6 and to ports E1-5, E2-5, and E 3-5 to maintain connectivity with nodes N1, N2, and N3 in another sub-graph.

FIG. 6 illustrates an example sub-graph 600. Sub-graph 600 includes each of the nodes classified as being intended for implementation in the DPE array. In creating sub-graph 600, the connectivity among the nodes included in the sub-graph is preserved. For those nodes in sub-graph 600 that connect to nodes not included in sub-graph 600, such nodes are connected to port(s) of sub-graph 400. For example, node N14 is connected to nodes N15 and N16 and to port E 13-14 to maintain connectivity with nodes N13 in another sub-graph. Node N21 is connected to port E 20-21 to maintain connectivity with node N20 in another sub-graph.

In one aspect, each of the resulting sub-graphs 400, 500, and 600 may be independently processed and optimized to generate different components of the heterogeneous system. When interconnected, each sub-graph and resulting hardware implementation still represents the functional characteristics and implementation details of the original model. As such, the particular output product of an individual node, and hence, the target hardware (e.g., system of the target IC), may change dynamically based on the classification and partitioning performed on the data flow graph.

Once the sub-graphs are generated, a variety of hardware implementation tools may be used to generate the configuration data needed to implement the model within the target IC. The hardware implementation tools may include, for example, hardware and software compilers, various libraries (e.g., DPE array libraries and/or IP libraries for the programmable logic), linkers, and the like.

In one aspect, the modeling system is capable of processing each of the different sub-graphs to generate HLL program code (e.g., source code). For example, referring to sub-graph 400 corresponding to the portion of the model to be implemented in the programmable logic, the modeling system is capable of generating HLL program code that is hardware synthesizable from sub-graph 400. Hardware synthesizable program code refers to syntactically correct HLL program code that may be processed by a hardware implementation tool capable of performing high-level synthesis. The hardware synthesizable program code may be specified as source code in an HLL such as C, C++, or other alternative HLL.

In one aspect, the modeling system transforms sub-graph 400 into an abstract syntax tree (AST) as an intermediate representation. The modeling system is capable of generating the hardware synthesizable program code by performing operations such as building an AST that is functionally equivalent to sub-graph 400. In doing so, the modeling system traverses, or examines, each node of the sub-graph in the order of dependency and applies HLL constructs such as types, expressions, statements, symbols, declarations, directives, and the like to the AST. The modeling system also is capable of processing and optimizing the AST by adding hardware directives, enabling parallel programming, and performing other known optimizations that result in improved data throughput for hardware implemented in programmable logic. The modeling system also may perform other operations to generate hardware synthesizable program code that conforms to known standards used by a high-level synthesis tool to ensure a high quality of result. From the resulting AST, the modeling system generates the hardware synthesizable program code.

Referring to sub-graph 500 corresponding to the portion of the model to be implemented in the processor system, the modeling system is capable of generating program code from sub-graph 500 that is compatible and executable by one or more of the various processors included in the processor system. The program code may be specified in an HLL as source code such as C, C++, or other HLL. The modeling system is capable of building an AST that is functionally equivalent to sub-graph 500. The modeling system may do so by traversing, e.g., examining, each node of the sub-graph in the order of dependency using AST constructs such as types, expressions, statements, declarations, and the like. The modeling system is also capable of modifying the AST to meet memory requirements, performance, and efficiency for the target processor of the processor system. The modeling system is capable of generating HLL that is targeted to the particular processor of the processor system of the target IC on which the program code is to execute.

Referring to sub-graph 600 corresponding to the portion of the model to be implemented in the DPE array, the modeling system is capable of generating HLL source code that defines or specifies a further data flow graph from sub-graph 600. The further data flow graph is referred to herein as a "DPE array graph." In one aspect, HLLs used to specify the DPE array graph may include markup languages suitable for implementing a data flow graph. The DPE array graph is a data flow graph that is targeted to the DPE array and, as such, may be mapped onto the DPE array of the target IC. That is, the DPE array graph has nodes corresponding to kernels that may be mapped to particular cores of DPEs in the DPE array with edges mapped onto memories of the DPEs and/or data channels (e.g., streaming interconnects) of the DPE array. The kernels may be from a library of program code optimized for execution by the cores of the DPEs or user-specified program code.

For example, the modeling system is capable of transforming each node of the sub-graph representing a self-contained DPE library kernel, an imported (e.g., user-specified) kernel, or a further sub-graph into a compute node in the DPE array graph. The compute nodes map onto particular DPEs (e.g., the core of the DPE). The modeling system is further capable of classifying each edge of the sub-graph as a window connection, streaming connection, cascade connection, or real-time parameter interface based on the functionality of the edge and any user-specified attributes for the node. A "window connection" refers to a connection conveys a fixed or pre-deterministic amount of data between DPEs in the DPE array. Windows connections may be implemented using DPE local memories and buffers. A "stream connection" refers to a connection that transfers a variable amount of data between DPEs. Stream connections may be implemented using stream interconnects (e.g., an AXI-S connections available across the DPE array). A "cascade connection" refers to a direct core-to-core connection between DPEs in the DPE array. A "real-time parameter interface" refers to a connection that sends and/or receives signals/data between the PS and the DPEs. Real-time parameter connections may be implemented as memory mapped connections using internal DPE buffers (e.g., AXI-MM connections). The modeling system is capable of transforming the classified edges into data flow connectors that connect compute nodes in the DPE array graph. In one or more example implementations, the DPE array graph may be specified using an HLL such as C or C++ that is extended to include custom constructs for use in defining a data flow graph.

Figure 7:
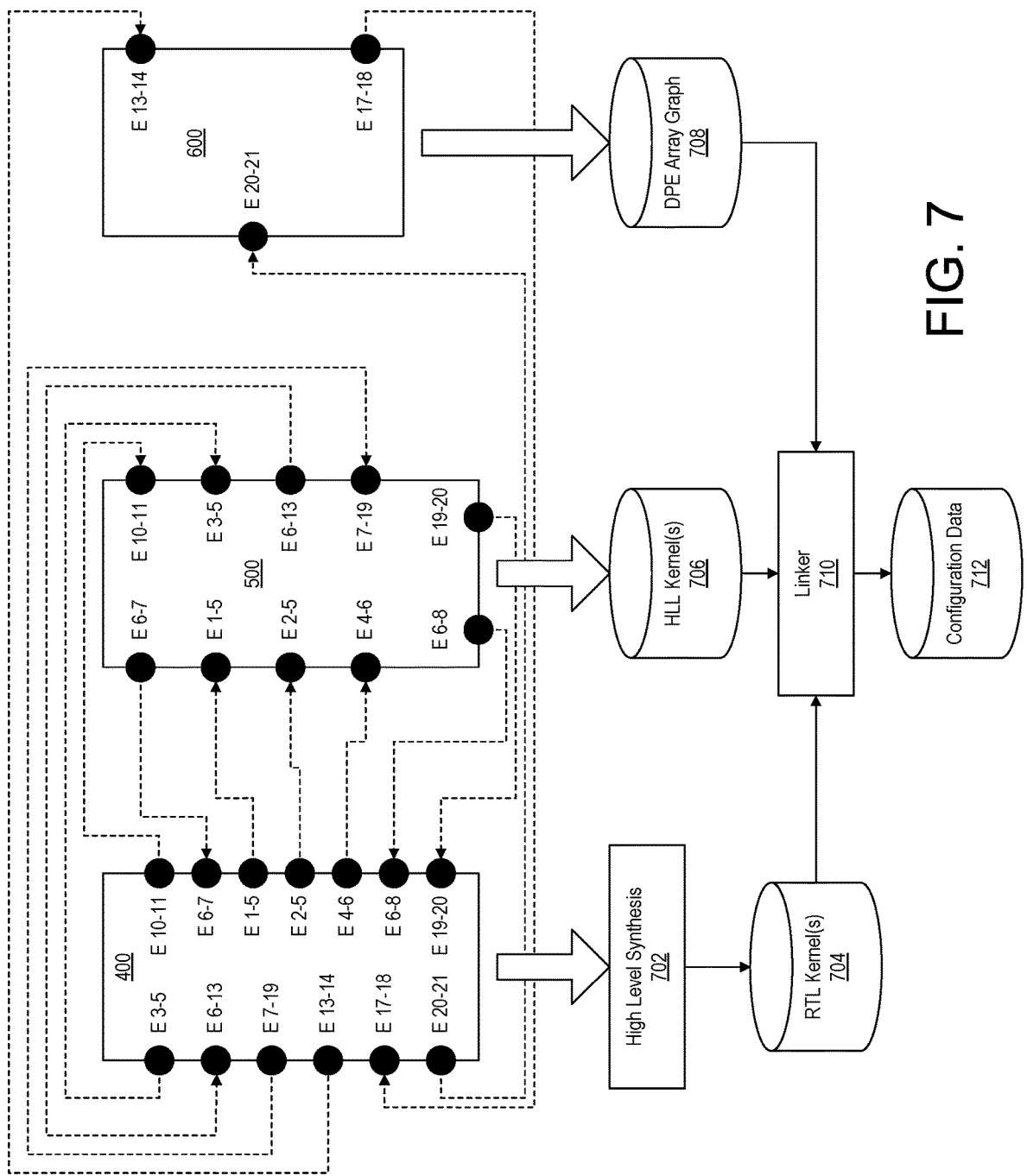
FIG. 7 illustrates generation of configuration data for the target IC from the sub-graphs.

FIG. 7 illustrates generation of configuration data for the target IC from the sub-graphs. The configuration data is loadable within the target IC to configure the target IC to implement the model initially created in the modeling system.

In the example of FIG. 7, the HLL program code generated from sub-graph 400, corresponding to the portion of the model to be implemented in the programmable logic, is processed by an implementation tool capable of performing high-level synthesis 702. The implementation tool generates one or more RTL kernels 704 with correct connectivity. In one aspect, the RTL kernels 704 may be placed and routed.

The HLL program code generated from sub-graph 500 corresponding to the portion of the model to be implemented by the processor system is represented as HLL kernels 706. HLL kernels 706, which may be compiled program code, are targeted to the particular processor(s) of the processor system (e.g., RTP, APU, GPU, etc.) upon which such HLL program code will execute. The DPE array graph generated from sub-graph 600 corresponding to the portion of the model to be implemented in the DPE array is shown as DPE array graph 708.

Linker 710 is capable of linking the RTL kernels 704, HLL kernels 706, and DPE array graph 708 and generating configuration data 712 from the linked portions. Linker 710 is capable of establishing the address space and/or logical connections between the components for the various systems of the target IC. Configuration data 712 is loadable within the target IC to implement an electronic system therein that is functionally equivalent to the original model created in the modeling system. Configuration data 712 may include, for example, one or more configuration bitstreams that configure the programmable logic, one or more binaries of compiled program code for execution by processors of the processor system, and configuration data for the DPE array.

Within the example implementations described herein, it should be appreciated that while the model processing described uses three different systems of the target IC, fewer or more systems may be incorporated into the processing described based on the particular target IC used and the particular model that is created. For example, though the target IC may include a processor system, programmable logic, and a DPE array, the model that is created may only use the processor system and the DPE array, the processor system and the programmable logic, or any combination of the systems. As such, the classification, partitioning, HLL program code generation, and/or DPE array graph generation that is performed will vary and depend on the target IC and the original model being processed as not all systems may be needed or used by the model. In cases where the target IC includes additional systems not described herein, the example classification and partitioning described herein may be adapted to such additional systems.

FIG. 8 illustrates an example method 800 of implementing a model within a target IC having a plurality of heterogeneous systems. Method 800 may be performed by a system such as the example computer described in connection with FIG. 9. The system may execute a modeling system as described herein. The system further may execute one or more hardware implementation tools. The IC in which the model is to be implemented includes a plurality of heterogeneous systems.

In block 802, the system is capable of converting a model, created as a data structure using a modeling system, into a data flow graph. The model represents a design for implementation in an IC having a plurality of heterogeneous systems. In block 804, the system is capable of classifying nodes of the data flow graph for implementation in different ones of the plurality of systems of the IC. In block 806, the system is capable of partitioning the data flow graph into a plurality of sub-graphs based on the classifying performed in block 804. Each of the sub-graphs corresponds to a different one of the plurality of systems. In block 808, the system is capable of generating, from each sub-graph, a portion of HLL program code, wherein each portion of HLL program code is specific to the system corresponding to the sub-graph from which the portion of HLL program code was generated.

The foregoing and other implementations can each optionally include one or more of the following features, alone or in combination. Some example implementations include all the following features in combination.

In one aspect, a first system of the plurality of systems is programmable logic and the portion of the HLL program code for the first system is hardware synthesizable.

In another aspect, a second system of the plurality of systems is a hardwired processor system having a hardwired processor configured to execute program code and the portion of HLL program code for the second system is executable by the hardwired processor. The HLL program code for the processor is functionally correct.

In another aspect, a third system of the plurality of systems is a data processing engine array and the portion of HLL program code for the third system specifies a DPE array graph including a plurality of compute nodes connected by data flow connectors.

In another aspect, the method can include linking the portions of the HLL program code for the systems of the IC and generating, from the linked portions of the HLL program code, configuration data loadable within the IC to implement the design within the IC.

The nodes of the data flow graph may be classified based, at least in part, on data throughput of the nodes, power constraints corresponding to the nodes, operating frequency of the nodes, and/or whether nodes of the data flow graph are designated as control nodes.

In another aspect, connectivity among nodes of the data flow graph is maintained across the sub-graphs during the partitioning.

The example implementations described within this disclosure, by way of the partitioning and linking, guarantee that the functional characteristics of the original model are preserved and implemented in each respective system in the resulting hardware. The generated designs for each system of the target IC may be independently verified and also verified as a whole, e.g., across the systems of the target IC.

In another example implementation, the modeling system is capable of capturing data at ports of the model blocks of the model during simulation of the model. This data captured at the ports of the model blocks may be used by the system to generate test benches to verify the generated hardware design. For example, the verification may include validating HLL code for the sub-graph corresponding to the programmable logic using C simulation or RTL simulation. Verification may include validating the HLL code for the sub-graph corresponding to the processor system using a software emulation. Verification may include validating the DPE array graph using a software-based DPE array simulator. The linked design, e.g., the configuration data, may be validated using different ones of the emulators as described in combination.

Figure 9:
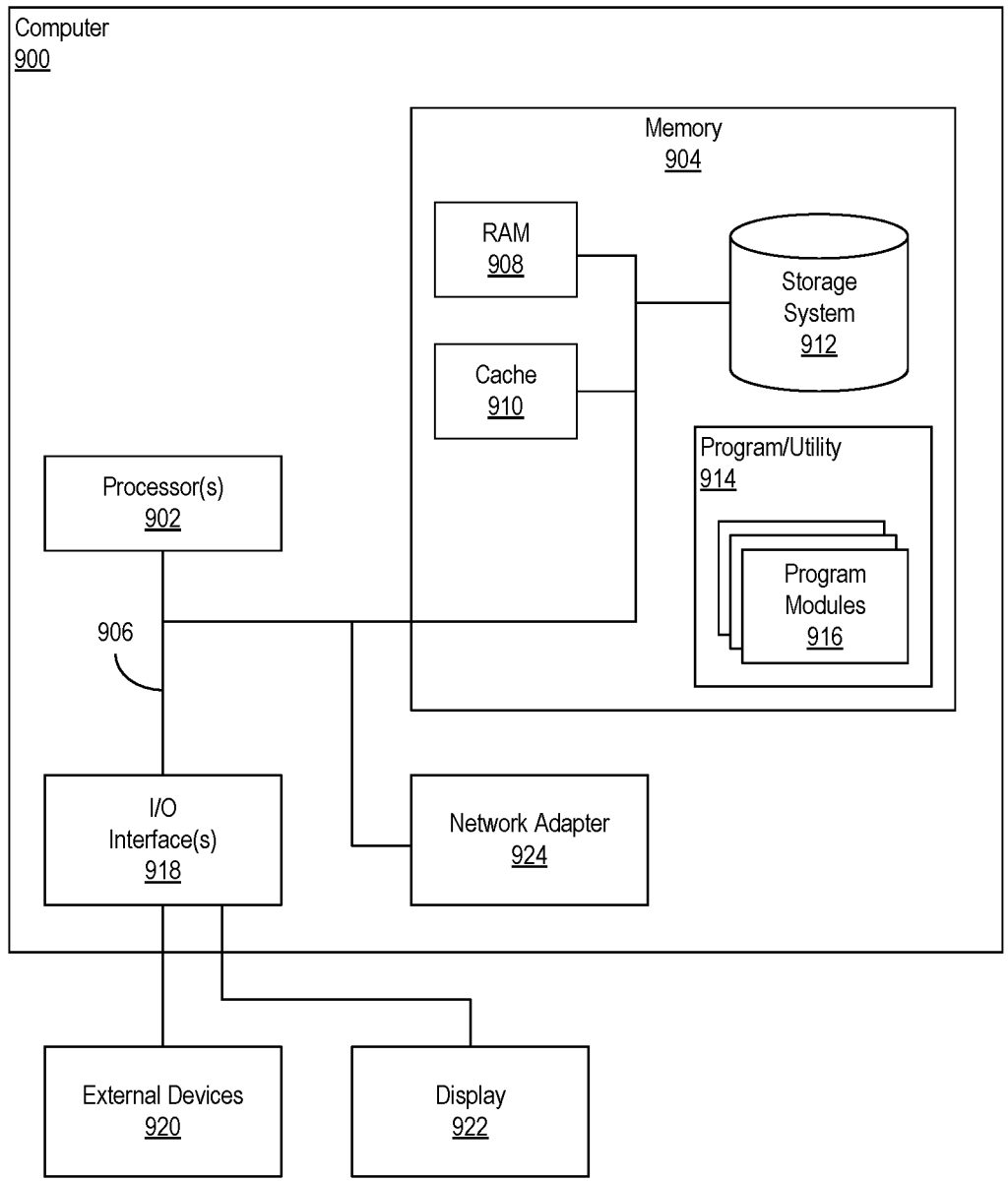
FIG. 9 illustrates an example of a computer that may be used to execute a modeling environment including a model-based design tool as described within this disclosure.

FIG. 9 illustrates an example of a computer 900. Computer 900 may be used in a standalone capacity, e.g., as a user computing device, as a server, as part of a computing cluster (e.g., two or more interconnected computers), or as a cloud computing node. The example of FIG. 9 is not intended to suggest any limitation as to the scope of use or functionality of example implementations described herein. Computer 900 is an example of a system and/or computer hardware that is capable of performing the various operations described within this disclosure. Computer 900, for example, is capable of executing a modeling system and one or more hardware implementation tools (e.g., placer(s), router(s), configuration bitstream generator(s), linkers, etc.) as described herein.

Computer 900 may be operational with numerous other general-purpose or special purpose computing system environments or configurations. Examples of computing systems, environments, and/or configurations that may be suitable for use with computer 900 include, but are not limited to, personal computer systems, server computer systems, thin clients, thick clients, hand-held or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Computer 900 can be described in the general context of computer system-executable instructions, such as program modules, that are executable by a computer system. Generally, program modules can include routines, programs, objects, components, logic, data structures, and so on that perform particular tasks or implement particular abstract data types. Computer 900 can be practiced as a standalone computer system such as a server or in distributed cloud computing environments where tasks are performed by remote processing devices that are linked through a communications network. In a distributed cloud computing environment, program modules may be located in both local and remote computer system storage media including memory storage devices.

As shown in FIG. 9, the components of computer 900 can include, but are not limited to, a processor 902, a memory 904, and a bus 906 that couples various system components including memory 904 to processor 902. Processor 902 may be implemented as one or more processors.

Bus 906 represents one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, Peripheral Component Interconnect (PCI) bus, and PCI Express (PCIe) bus.

Computer 900 typically includes a variety of computer system readable media. Such media may include computer-readable volatile and non-volatile media and computer readable removable and non-removable media.

Memory 904 can include computer readable media in the form of volatile memory, such as random-access memory (RAM) 908 and/or cache memory 910. Computer 900 can also include other removable/non-removable, volatile/non-volatile computer storage media. By way of example, storage system 912 can be provided for reading from and writing to a non-removable, non-volatile magnetic and/or solid-state media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 906 by one or more data media interfaces. Memory 904 is an example of at least one computer program product having a set (e.g., at least one) of program modules that are configured to carry out the functions of embodiments of the invention.

Program/utility 914, having a set (at least one) of program modules 916, may be stored in memory 904. By way of example, program modules 916 may represent an operating system, one or more application programs, other program modules, and program data. Program modules 916 generally carry out the functions and/or methodologies of the example implementations described within this disclosure. For example, one or more of the program modules can perform the various operations described within this disclosure including, but not limited to, those described in connection with the modeling system and/or the hardware implementation tools.

Program/utility 914 is executable by processor 902. Program/utility 914 and any data items used, generated, and/or operated upon by computing node 900 are functional data structures that impart functionality when employed by computing node 900. As defined within this disclosure, a "data structure" is a physical implementation of a data model's organization of data within a physical memory. As such, a data structure is formed of specific electrical or magnetic structural elements in a memory. A data structure imposes physical organization on the data stored in the memory as used by an application program executed using a processor.

Computer 900 may also communicate with one or more external devices 920 such as a keyboard, a pointing device, a display 922, etc.; one or more devices that enable a user to interact with computer 900; and/or any devices (e.g., network card, modem, etc.) that enable computer 900 to communicate with one or more other computing devices. Such communication can occur via input/output (I/O) interfaces 918. Still, computer 900 can communicate with one or more networks such as a local area network (LAN), a general wide area network (WAN), and/or a public network (e.g., the Internet) via a network adapter 924. As depicted, network adapter 924 communicates with the other components of computer 900 via bus 906. It should be understood that although not shown, other hardware and/or software components could be used in conjunction with computer 900. Examples, include, but are not limited to, microcode, device drivers, redundant processing units, external disk drive arrays, RAID systems, tape drives, and data archival storage systems, etc.

Computer 900 is an example of a data processing system. As defined herein, "data processing system" means one or more hardware systems configured to process data, each hardware system including at least one processor programmed to initiate operations and memory.

Computer 900 may include fewer components than shown or additional components not illustrated in FIG. 9 depending upon the particular type of device and/or system that is implemented. The particular operating system and/or application(s) included may vary according to device and/or system type as may the types of I/O devices included. Further, one or more of the illustrative components may be incorporated into, or otherwise form a portion of, another component. For example, a processor may include at least some memory.

For purposes of explanation, specific nomenclature is set forth to provide a thorough understanding of the various inventive concepts disclosed herein. The terminology used herein, however, is for the purpose of describing particular aspects of the inventive arrangements only and is not intended to be limiting.

As defined herein, the singular forms "a," "an," and "the" are intended to include the plural forms as well, unless the context clearly indicates otherwise.

As defined herein, the terms "at least one," "one or more," and "and/or," are open-ended expressions that are both conjunctive and disjunctive in operation unless explicitly stated otherwise. For example, each of the expressions "at least one of A, B, and C," "at least one of A, B, or C," "one or more of A, B, and C," "one or more of A, B, or C," and "A, B, and/or C" means A alone, B alone, C alone, A and B together, A and C together, B and C together, or A, B and C together.

As defined herein, the term "automatically" means without human intervention. As defined herein, the term "user" means a human being.

As defined herein, the term "computer readable storage medium" means a storage medium that contains or stores program code for use by or in connection with an instruction execution system, apparatus, or device. As defined herein, a "computer readable storage medium" is not a transitory, propagating signal per se. A computer readable storage medium may be, but is not limited to, an electronic storage device, a magnetic storage device, an optical storage device, an electromagnetic storage device, a semiconductor storage device, or any suitable combination of the foregoing. The various forms of memory, as described herein, are examples of computer readable storage media. A non-exhaustive list of more specific examples of a computer readable storage medium may include: a portable computer diskette, a hard disk, a RAM, a read-only memory (ROM), an erasable programmable read-only memory (EPROM or Flash memory), an electronically erasable programmable read-only memory (EEPROM), a static random access memory (SRAM), a portable compact disc read-only memory (CD-ROM), a digital versatile disk (DVD), a memory stick, a floppy disk, or the like.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the term "responsive to" and similar language as described above, e.g., "if," "when," or "upon," means responding or reacting readily to an action or event. The response or reaction is performed automatically. Thus, if a second action is performed "responsive to" a first action, there is a causal relationship between an occurrence of the first action and an occurrence of the second action. The term "responsive to" indicates the causal relationship.

As defined herein, the term "processor" means at least one hardware circuit capable of carrying out instructions. The instructions may be contained in program code. The circuit may be an integrated circuit or embedded in an integrated circuit.

As defined herein, the term "real-time" means a level of processing responsiveness that a user or system senses as sufficiently immediate for a particular process or determination to be made, or that enables the processor to keep up with some external process.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

The terms first, second, etc. may be used herein to describe various elements. These elements should not be limited by these terms, as these terms are only used to distinguish one element from another unless stated otherwise or the context clearly indicates otherwise.

A computer program product may include a computer readable storage medium (or media) having computer readable program instructions thereon for causing a processor to carry out aspects of the inventive arrangements described herein. Within this disclosure, the term "program code" is used interchangeably with the term "computer readable program instructions." Computer readable program instructions described herein may be downloaded to respective computing/processing devices from a computer readable storage medium or to an external computer or external storage device via a network, for example, the Internet, a LAN, a WAN and/or a wireless network. The network may include copper transmission cables, optical transmission fibers, wireless transmission, routers, firewalls, switches, gateway computers and/or edge devices including edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations for the inventive arrangements described herein may be assembler instructions, instruction-set-architecture (ISA) instructions, machine instructions, machine dependent instructions, microcode, firmware instructions, or either source code or object code written in any combination of one or more programming languages, including an object oriented programming language and/or procedural programming languages. Computer readable program instructions may include state-setting data. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or a WAN, or the connection may be made to an external computer (for example, through the Internet using an Internet Service Provider). In some cases, electronic circuitry including, for example, programmable logic circuitry, an FPGA, or a PLA may execute the computer readable program instructions by utilizing state information of the computer readable program instructions to personalize the electronic circuitry, in order to perform aspects of the inventive arrangements described herein.

Certain aspects of the inventive arrangements are described herein with reference to flowchart illustrations and/or block diagrams of methods, apparatus (systems), and computer program products. It will be understood that each block of the flowchart illustrations and/or block diagrams, and combinations of blocks in the flowchart illustrations and/or block diagrams, may be implemented by computer readable program instructions, e.g., program code.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the operations specified in the flowchart and/or block diagram block or blocks.

The computer readable program instructions may also be loaded onto a computer, other programmable data processing apparatus, or other device to cause a series of operations to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various aspects of the inventive arrangements. In this regard, each block in the flowchart or block diagrams may represent a module, segment, or portion of instructions, which comprises one or more executable instructions for implementing the specified operations.

In some alternative implementations, the operations noted in the blocks may occur out of the order noted in the figures. For example, two blocks shown in succession may be executed substantially concurrently, or the blocks may sometimes be executed in the reverse order, depending upon the functionality involved. In other examples, blocks may be performed generally in increasing numeric order while in still other examples, one or more blocks may be performed in varying order with the results being stored and utilized in subsequent or other blocks that do not immediately follow. It will also be noted that each block of the block diagrams and/or flowchart illustration, and combinations of blocks in the block diagrams and/or flowchart illustration, may be implemented by special purpose hardware-based systems that perform the specified functions or acts or carry out combinations of special purpose hardware and computer instructions.

The corresponding structures, materials, acts, and equivalents of all means or step plus function elements that may be found in the claims below are intended to include any structure, material, or act for performing the function in combination with other claimed elements as specifically claimed.

The description of the inventive arrangements provided herein is for purposes of illustration and is not intended to be exhaustive or limited to the form and examples disclosed. The terminology used herein was chosen to explain the principles of the inventive arrangements, the practical application or technical improvement over technologies found in the marketplace, and/or to enable others of ordinary skill in the art to understand the inventive arrangements disclosed herein. Modifications and variations may be apparent to those of ordinary skill in the art without departing from the scope and spirit of the described inventive arrangements. Accordingly, reference should be made to the following claims, rather than to the foregoing disclosure, as indicating the scope of such features and implementations.

What is claimed is:

1. A method, comprising:
converting a model, created as a data structure using a modeling system, into a data flow graph, wherein the model represents a design for implementation in an integrated circuit having a plurality of systems, the systems being heterogeneous;
classifying nodes of the data flow graph for implementation in different ones of the plurality of systems of the integrated circuit;
partitioning the data flow graph into a plurality of sub-graphs based on the classifying, wherein each sub-graph corresponds to a different one of the plurality of systems; and
generating, from each sub-graph, a portion of high-level language (HLL) program code, wherein each portion of HLL program code is specific to the system corresponding to the sub-graph from which the portion of HLL program code was generated.

2. The method of claim 1, wherein
a first system of the plurality of systems is programmable logic and the portion of the HLL program code for the first system is hardware synthesizable.

3. The method of claim 1, wherein
a first system of the plurality of systems is a hardwired processor system having a hardwired processor configured to execute program code and the portion of the HLL program code for the first system is executable by the hardwired processor.

4. The method of claim 1, wherein
a first system of the plurality of systems is a data processing engine array and the portion of the HLL program code for the first system specifies a data flow graph including a plurality of compute nodes connected by data flow connectors.

5. The method of claim 1, wherein
a second system of the plurality of systems is a data processing engine array and the portion of the HLL program code for the second system specifies a data flow graph including a plurality of compute nodes connected by data flow connectors.

6. The method of claim 1, further comprising:
linking the portions of the HLL program code for the systems of the integrated circuit; and
generating, from the linked portions of the HLL program code, configuration data loadable within the integrated circuit to implement the design within the integrated circuit.

7. The method of claim 1, wherein
the nodes of the data flow graph are classified based, at least in part, on data throughput of the nodes.

8. The method of claim 1, wherein
the nodes of the data flow graph are classified based, at least in part, on whether the nodes are control nodes.

9. The method of claim 1, wherein
the nodes of the data flow graph are classified based, at least in part, on at least one of:
power constraints corresponding to the nodes; or
operating frequency of the nodes.

10. The method of claim 1, wherein
connectivity among the nodes of the data flow graph is maintained across the sub-graphs during the partitioning.

11. A system, comprising:
a processor configured to initiate operations including:
converting a model, created as a data structure using a modeling system, into a data flow graph, wherein the model represents a design for implementation in an integrated circuit having a plurality of systems, the systems being heterogeneous;
classifying nodes of the data flow graph for implementation in different ones of the plurality of systems of the integrated circuit;
partitioning the data flow graph into a plurality of sub-graphs based on the classifying, wherein each sub-graph corresponds to a different one of the plurality of systems; and
generating, from each sub-graph, a portion of high-level language (HLL) program code, wherein each portion of HLL program code is specific to the system corresponding to the sub-graph from which the portion of HLL program code was generated.

12. The system of claim 11, wherein
a first system of the plurality of systems is programmable logic and the portion of the HLL program code for the first system is hardware synthesizable.

13. The system of claim 11, wherein
a first system of the plurality of systems is a hardwired processor system having a hardwired processor configured to execute program code and the portion of the HLL program code for the first system is executable by the hardwired processor.

14. The system of claim 11, wherein
a first system of the plurality of systems is a data processing engine array and the portion of the HLL program code for the first system specifies a data flow graph including a plurality of compute nodes connected by data flow connectors.

15. The system of claim 12, wherein
a second system of the plurality of systems is a data processing engine array and the portion of the HLL program code for the second system specifies a data flow graph including a plurality of compute nodes connected by data flow connectors.

16. The system of claim 11, wherein the processor is configured to initiate operations comprising:
linking the portions of the HLL program code for the systems of the integrated circuit; and
generating, from the linked portions of the HLL program code, configuration data loadable within the integrated circuit to implement the design within the integrated circuit.

17. The system of claim 11, wherein
the nodes of the data flow graph are classified based, at least in part, on data throughput of the nodes.

18. The system of claim 11, wherein
the nodes of the data flow graph are classified based, at least in part, on whether the nodes are control nodes.

19. The system of claim 11, wherein
the nodes of the data flow graph are classified based, at least in part, on at least one of:
power constraints corresponding to the nodes; or
operating frequency of the nodes.

20. A computer program product, comprising:
one or more non-transitory computer readable storage media, and program instructions collectively stored on the one or more non-transitory computer readable storage media, wherein the program instructions are executable by computer hardware to initiate operations including:
converting a model, created as a data structure using a modeling system, into a data flow graph, wherein the model represents a design for implementation in an integrated circuit having a plurality of systems, the systems being heterogeneous;
classifying nodes of the data flow graph for implementation in different ones of the plurality of systems of the integrated circuit;
partitioning the data flow graph into a plurality of sub-graphs based on the classifying, wherein each sub-graph corresponds to a different one of the plurality of systems; and
generating, from each sub-graph, a portion of high-level language (HLL) program code, wherein each portion of HLL program code is specific to the system corresponding to the sub-graph from which the portion of HLL program code was generated.

* * * * *